W. C. SMEND AND W. P. SPRECKELS.
METHOD OF PACKAGING CUBE SUGAR.
APPLICATION FILED MAY 12, 1921.
1,431,702.  Patented Oct. 10, 1922.
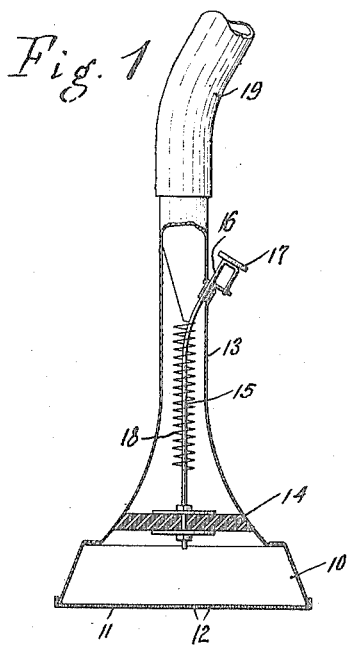
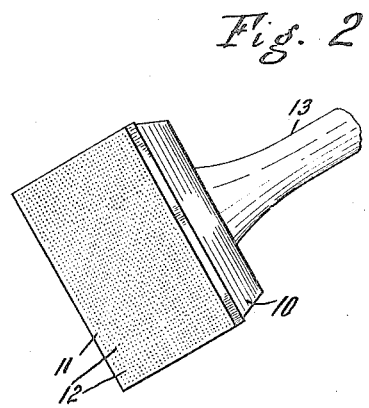
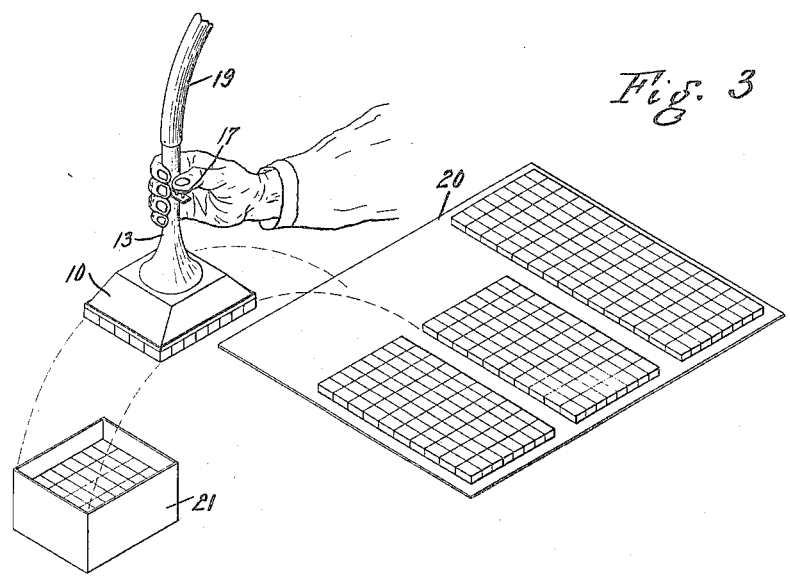
Wm C. Smend & W. P. Spreckels, Inventors
By their Attorney
Sigmund Herzog Patented Oct. 10, 1922.

1,431,702

UNITED STATES PATENT OFFICE.

WILLIAM C. SMEND, OF JERSEY CITY, NEW JERSEY, AND WALTER P. SPRECKELS, OF YONKERS, NEW YORK.

METHOD OF PACKAGING CUBE SUGAR.

Application filed May 12, 1921. Serial No. 469,074.

*To all whom it may concern:*

Be it known that we, WILLIAM C. SMEND and WALTER P. SPRECKELS, citizens of the United States, and residents of Jersey City and Yonkers, respectively, in the counties of Hudson and Westchester, respectively, and States of New Jersey and New York, respectively, have invented certain new and useful Improvements in a Method of Packaging Cube Sugar, of which the following is a specification.

The present invention relates to an improved method of packaging cube or tablet sugar, and more particularly disposing the same in boxes with orderly arrangement that is to say in layers.

The main object of the present invention is to provide a method which utilizes the vacuum principle for handling of sugar cubes, more particularly lifting, transporting and releasing a plurality of the same simultaneously, said method necessitating a very simple apparatus and permitting of an automatic release of the sugar cubes when the same arrive in the box, into which they are to be packed.

Generally speaking, the method involved in the present invention consists in causing a layer of sugar cubes to adhere by suction to a transporting means, maintaining a partial vacuum through the transporting means while moving the transporting means and the sugar adhering thereto to a desired position, discontinuing the action of the vacuum creating means, and releasing the sugar cubes by permitting a flow of air therethrough into the transporting means.

One of the many possible apparatuses for carrying out this method is illustrated in the accompanying drawings, in which Figure 1 is a longitudinal vertical sectional view taken through the lifting and transporting apparatus; Fig. 2 is a perspective view thereof, looking from below; and Fig. 3 is a perspective view illustrating the mode of operation of the said apparatus.

In the drawings, the numeral 10 indicates a casing, having a flat bottom 11, that is provided over its entire surface with fine perforations 12. The configuration of this bottom and generally that of the casing corresponds to that of the box into which the sugar cubes are to be packed, and the size of the said casing bottom is somewhat smaller than that of the box bottom, in order to permit the said casing to be conveniently lowered into the said box. On the top of the casing 10 is mounted a hollow substantially funnel-shaped body 13, which is adapted to communicate with the interior of the said casing, the communication being controlled by a valve 14 of any suitable material, for instance rubber. This valve is mounted upon a stem 15, the upper portion of which, denoted by the numeral 16, extends at an angle to the main portion of the said stem, it projecting through the body 13 and being provided outside of the same with a knob 17, to permit of convenient actuation of the valve. A spring 18 serves to seat the valve, said spring being in the case illustrated in the drawings in the form of a helix, that is coiled around the stem 15, one of the ends of said spring being fixed to said stem and its other end to the body 13. The free end of the body 13 is connected by a flexible tube 19 with a suitable vacuum creating device, such as a pump, exhaust fan or similar mechanism, not shown. The flexible connection 19 permits the transporting mechanism to be moved both vertically and horizontally.

The body 13 constitutes the handle of the transporting mechanism, it being shaped to be held readily in the hand of the operator in such position that one of the fingers rests upon the knob 17, to permit of a convenient actuation of the valve 14.

The sugar cubes to be packed are arranged in a single layer on a tray or plate 20 (Fig. 3), a plurality of rows of cubes being transported simultaneously from said tray into the box by the mechanism above described. In using the apparatus, the same is placed with its perforated bottom 11 onto the layer of cubes on the tray 20, the knob 17 being depressed, to establish communication between the source of suction and the interior of the casing 10. In this manner a flow of air is induced through the sugar cubes and casing, whereby a partial vacuum is created in the casing, sufficient to cause the sugar cubes to adhere tightly thereto. With this vacuum maintained, the apparatus may now be moved, carrying the sugar cubes to the box 21 (Fig. 3), into which they are to be packed. When the cubes are positioned within the box, the operator lifts the finger from the knob 17, thus permitting the spring 15 to seat the valve 14, whereby a communication between the interior of the casing 10 and the suction creating mechanism is closed. The partial vacuum within the casing is destroyed by reason of the fact that outside air will enter the casing through the sugar cubes, the latter being, as well known, porous. As soon as the vacuum is lowered below a certain point, the cubes are automatically released by the transporting mechanism. In practice it has been found that the release is instantaneous, so that the valve should be seated when the cubes have arrived within the box.

From the foregoing it appears that there are no special means provided for opening a communication between the atmosphere and the casing 10 after the communication between the latter and the suction creating means has been closed. The device is thus simpler than those heretofore used in handling materials, the release of the sugar cubes or tablets being brought about by air entering the transporting mechanism through the material handled.

What we claim is:—

1. The method of handling sugar cubes or tablets which consists in causing a layer of sugar cubes or tablets to adhere by suction to a transporting means, maintaining a partial vacuum through the transporting means while moving the same and the sugar adhering thereto to a desired position, and then lowering the vacuum by the inflow of air through the sugar into the transporting means, whereby the sugar is released.

2. The method of handling sugar cubes or tablets which consists in causing a layer of sugar cubes or tablets to adhere by suction to a transporting means, moving the transporting means and the sugar adhering to a desired position, and releasing the sugar by the inflow of air through the sugar into the transporting means.

3. The method of handling sugar cubes or tablets which consists in causing a layer of sugar cubes or tablets to adhere by suction to a transporting means, maintaining the suction through the transporting means while moving the same and the sugar adhering thereto to a desired position, interrupting then the suction and releasing the sugar by the inflow of air through the sugar into the transporting means.

4. The method of handling sugar cubes or tablets which consists in causing a layer of sugar cubes or tablets to adhere to a transporting means by a flow of air induced through the sugar and the transporting means, maintaining this flow of air while moving the transporting means and the sugar adhering thereto to a desired position, and then releasing the sugar by stopping the flow of air through the transporting means but permitting such flow through the sugar.

5. The method of handling sugar cubes or tablets which consists in causing a layer of sugar cubes or tablets to adhere to a transporting means by a flow of air induced through the sugar and the transporting means, maintaining this flow of air while moving this transporting means and the sugar adhering thereto to the desired position, and then releasing the sugar by stopping the flow of air through the transporting means.

Signed at New York, in the county of New York and State of New York, this 4th day of May, 1921.

WILLIAM C. SMEND.
WALTER P. SPRECKELS.